United States Patent Office 3,583,967
Patented June 8, 1971

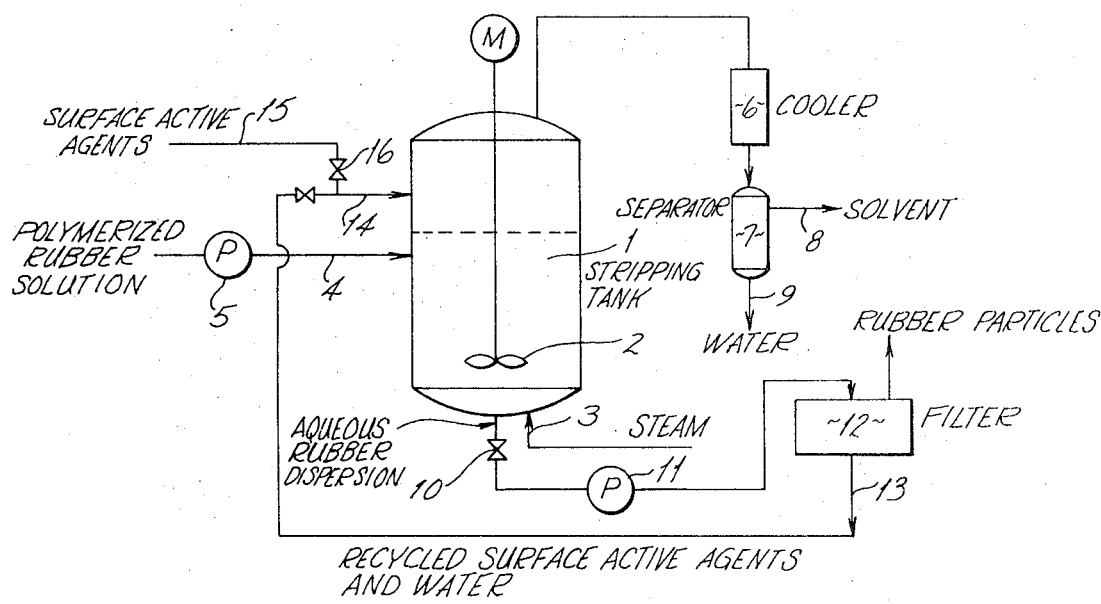

3,583,967
METHOD FOR OBTAINING POLYMER FROM POLYMER SOLUTION
Kenichi Hattori, Wakayama-shi, and Yoshiaki Komeda, Funabashi-shi, Japan, assignors to Kao Soap Co., Ltd., Tokyo, Japan
Filed Dec. 6, 1968, Ser. No. 781,874
Int. Cl. C08d 5/02; C08f 1/92
U.S. Cl. 260—94.7  3 Claims

ABSTRACT OF THE DISCLOSURE

A synthetic rubber or rubbery polymer is recovered in the form of a dispersion of particles thereof in water by feeding, into heated water in the presence of surface active agents acting as an anionic surface active agent and a cationic surface active agent, a solvent solution of the synthetic rubber or rubbery polymer obtained by solution-polymerization, and stripping the solvent from the solution.

BACKGROUND OF THE INVENTION

Field of the invention

This invention relates to a method for obtaining a polymer from a polymer solution of a synthetic rubber or a rubbery polymer (including a copolymer) obtained by solution-polymerization in an organic solvent. More particularly, the present invention relates to a method for obtaining a polymerized substance by pouring a solution of a polymerized substance into water and heating and stirring the mixture so that the solvent may be stripped from the polymerized substance and the polymerized substance may be dispersed as small particles in the water.

When a polymer solution obtained by a solution-polymerization procedure is poured into water and the solvent is recovered by steam-stripping, if the polymer can be dispersed as fine particles in the water without forming lumps, it will be possible to convey an aqueous slurry of the polymer through conduits to a subsequent filtering process. Therefore, the solvent will be continuously stripped and it will be possible to continuously recover the polymer.

Recently, in an industry such as the synthetic rubber industry, it has become very important to continuously recover a rubber component from a polymerized rubber solution. However, when a solution of a rubbery polymer is poured into water while it is being heated and stirred, the solvent will be stripped but, at the same time, a viscous rubber substance will be precipitated in the water. This substance will tend to adhere to the walls of the vessel or the stirrer, or will form lumps, and accordingly, it cannot be recovered as an aqueous slurry which can be conveyed through conduits.

The purpose of the present invention is to recover a rubber or a rubbery polymer from an organic solvent solution thereof by steam-stripping the solvent and forming an aqueous slurry in which said rubber or rubbery polymer is dispersed as fine particles.

SUMMARY OF THE INVENTION

According to the present invention, a combination of the following-named two kinds of surface active agents is used to make it easy to disperse a polymerized substance, such as synthetic rubber, in water. That is to say, the present invention provides a method for obtaining a polymer from a polymer solution in which both an anionic surface active agent and a cationic surface active agent are added into the system when a solution of a synthetic rubber or other rubbery polymerized substance obtained by a solution-polymerization in an organic solvent is poured into heated water, so that the solvent is stripped and an aqueous slurry containing the polymerized substance in the form of dispersed fine particles is recovered.

In the present invention, since no inorganic salt, such as $Ca^{++}$, $Ba^{++}$, $Al^{+++}$, etc. is used, the ash content of the rubber will not be increased. Further, the surface active agents used in the process of the present invention can also play the role of a dispersing assistant for a reinforcing agent, such as carbon black, in rubber and, therefore, there is no risk of deteriorating the rubber component.

The purpose of the present invention can be attained by simultaneously using the following two kinds of surface active agents. That is to say, one of them is an anionic surface active agent and, particularly, an anionic water-soluble macromolecular substance having a plurality of carboxyl groups in the molecule, which will hereinafter be generally referred to as an anionic macromolecular surface active agent or an anionic macromolecular electrolyte. The other is a cationic surface active agent (which term also includes a cationic water-soluble macromolecular surface active agent electrolyte).

These two kinds of surface active agents, that is, an anionic active agent and a cationic active agent are used in the form of a mixture at an appropriate weight ratio of said agents. Generally, when both an anionic active agent and a cationic active agent are used, a precipitation will often occur. But, when an anionic active agent is used in excess and a cationic active agent is used in a smaller amount or vice versa, a solubilization effect will be caused and no precipitation will occur. Particularly, when a cationic surface active agent in an amount smaller than the equivalent is added into an anionic macromolecular electrolyte, or vice versa, no precipitation will occur. Therefore, in the practice of the present invention, such combinations of surface active agents are preferred.

DESCRIPTION OF A PREFERRED EMBODIMENT

A preferred embodiment of the present invention shall be now described with reference to the accompanying drawing which is a schematic view of a representative apparatus for carrying out the process of the present invention.

Referring to the drawing, a stripping tank 1 containing an aqueous solution, into which surface active agents are added, is heated by supplying steam from conduit 3. The temperature in the tank 1 is maintained at a higher value than the azeotropic temperature of the solvent of the polymer solution and water. For example, when the solvent of the polymer solution is toluene, a temperature of 90 to 95° C. in the tank 1 is optimum. A stirrer 2 in the tank 1 is rotated by a motor M. A polymerized rubber solution is fed into the tank 1 through a conduit 4 by means of a pump 5. The solvent, which is stripped by forming an azeotrope with water, will enter a separator 7 after passing through a cooler 6. The solvent is recovered at conduit 8 and the water is separated at conduit 9.

The rubber component which was precipitated and dispersed as fine particles in the water is conveyed through a valve 10 by means of a pump 11 to a filter 12. The rubber particles are recovered at the filter 12. Since the filtrate flowing through conduit 13 still contains the surface active agents, it will be recycled to the stripping tank 1 through conduit 14. Make-up surface active agents are supplied through conduit 15 and a valve 16.

The surface active agents used in the present invention will now be described more in detail.

(A) As the anionic surface active agents, there can be used not only the so-called anionic surface active agents according to the strict definition in the classification of surface active agents, but also anionic water-soluble macromolecular substances which are particularly effective for the purpose of the present invention.

(I) For the so-called anionic surface active agents, there can be used fatty acid salts (RCOONa), higher alcohol sulfates (ROSO₃Na), liquid fatty oil sulfates [R(OSO₃Na)COOR'], sulfates of aliphatic amines and sulfates of aliphatic amides (RCONHR'CH₂CH₃OSO₃Na)

fatty alcohol phosphate esters [ROP(ONa)₂] (sulfonates of dibasic fatty acid esters (ROCOCH₂ROCOCH—SO₃Na)

fatty acid amide sulfonates (RCONR'CH₂CH₂SO₃Na) and alkylaryl sulfonates

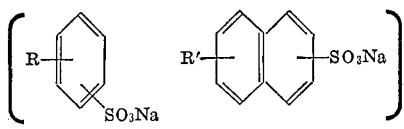

These may also be used in the form of their free acids. The values of R in the foregoing formulae can be any of those conventionally used in such anionic surface active agents and they are not critical.

(II) For the anionic water-soluble macromolecular substances, there can be used:

(1) Polymers of acrylic acid and methacrylic acid and their salts, copolymers of these monomers with other copolymerizable monomers and further polymers and copolymers of esters of acrylic acid and methacrylic acid partly saponified so as to be water-soluble.

(2) Polymers of unsaturated dibasic acids such as maleic anhydride, maleic acid, fumaric acid and itaconic acid, their copolymers with other copolymerizable monomers and their salts, polymers and copolymers of diesters and monoesters of these dibasic acids and their partially saponified substances.

(3) Water-soluble macromolecular substances having sulfonic acid groups in the molecule, which will include formalin condensates of aromatic sulfonic acids such as formalin condensates of ligninsulfonic acid and naphthalene (or alkylnaphthalene) sulfonic acid, formalin condensates of benzene (or alkylbenzene) sulfonic acid and formalin condensates of the sulfonate of creosote oil, and polymers and copolymers of vinylsulfonic acid. They can also be used in the form of their free acids and salts.

(4) Partially saponified substances of polymers of acrylamide or acrylonitrile and their copolymers with other monomers.

Other anionic macromolecular substances different than those mentioned above can also be used. For example, CMC and sodium alginate are also effective. Rosin soaps also can be used. Further anionic macromolecular substances which can be obtained by polycondensing the substances rich in unsaturated bonds and obtained in petroleum cracking and distillation processes with other substances are also effective.

(B) As the cationic surface active agents to be used together with the anionic surface active agents, there can be used not only the so-called cationic active agents according to the strict definition in the classification of surface active agents, but also cationic macromolecular electrolytes.

(I) For the so-called cationic surface active agents, there can be used aliphatic amino salts

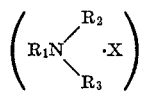

quaternary ammonium salts

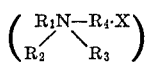

alkylpyridium salts

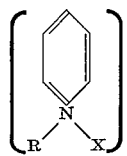

polyoxyethylene alkylamine salts

[R—N((CH₂CH₂O)ₙH)₂]

and imidazoline derivatives

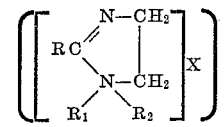

Further, as fatty acid amine derivatives, the derivatives of polyamines such as diamines and triamines are also effective. For example, there can be mentioned hydrogenated tallow propylene diamine diacetate (RNHCH₂CH₂NH₂·2CH₃COOH)

Amine derivatives not made quaternary and amine oxides also can be used. The values of R, R₁ and R₂ can be any of those conventionally used in such surface active agents and they are not critical. X identifies any salt which is usable and it also is not critical.

(II) For the cationic water-soluble macromolecular surface active agents, there can be used polyvinyl pyridine-type polysoaps

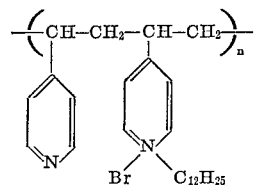

polyacrylic ester-type cationic surface active agents

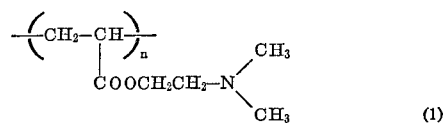

(1)

quaternary surface active agents derived from the above (1), their copolymers and polyacrylamide-type cationic surface active agents, for examples,

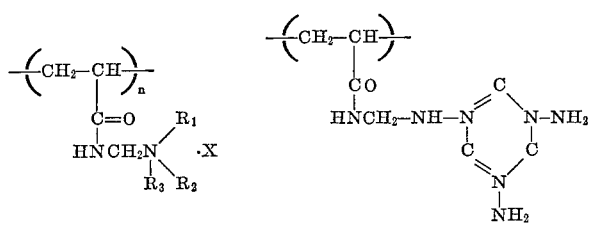

All other cationic macromolecular electrolytes are also effective. The values of R₁, R₂ and R₃ can be any of those conventionally used in such surface active agents and they are not critical. X identifies any salt which is usable and it also is not critical.

As described above, the method of the present invention is characterized by using both an anionic active agent and a cationic active agent. In the practice of the invention, as described above, either the anionic active agent or the cationic active agent should be used in excess so as not to cause precipitation of surface active agents. This can be accomplished by using either the anionic surface active agent in excess or the cationic active agent in excess. But, generally, it will be more advantageously economically to use the anionic active agent in excess.

Further, it will be more effective to use a macromolecular surface active agent, as disclosed above, as either the anionic surface active agent or the cationic surface active agent or for both of them. Generally, the surface active agents used in the method are dissolved in an aqueous solution in the stripper tank 1 in advance. However, if necessary, the surface active agent can be used by adding it into the solution of polymerized rubber in the solvent.

Further, in the present invention, an amphoteric surface active agent, such as a high alkylalanine type or a betaine type, can be used in place of either the anionic surface active agent and the cationic surface active agent so that it is mixed with the anionic or cationic active agent. The pH is properly adjusted so that the amphoteric surface active agent may act as a cationic or anionic surface active agent to accomplish the purpose of the present invention.

In carrying out the present invention, the amounts of the surface active agents are each used usually in amounts of from about 0.001 to 10 parts by weight per 100 parts by weight of the polymerized rubbery substance to be recovered. However, depending on the kind of the active agent used, a smaller amount of the surface active agent may be effective. Usually, 0.1 to 2.0 parts by weight of surface active agent are used per 100 parts by weight of the polymerized rubber substance to be recovered.

The effect of the surface active agents in the method of the present invention is to prevent the adhesion of the rubbery substance precipitated in the water, to disperse it as fine granular rubber particles in the water and to make it possible to convey them through conduits as an aqueous slurry without the formation of lumps. However, the size of the rubber particles precipitated in the operation will be greatly influenced by the structure and stirring velocity of the stirrer. Further, the velocity of pouring the polymerized solution into the heated water and the concentration of the solution will also greatly influence the size of the rubber particles to be formed.

surface active agent produced by Kao Soap company, Ltd., Japan) and 0.001% Quatamine 86P (trade name of a quaternary ammonium salt-type cationic surface active agent produced by Kao Soap Company, Ltd.) were placed in a four-necked flask of a capacity of 1 liter and were heated to 90° C. The stirrer was rotated at 800 R.P.M. and 40 g. of a toluene solution containing 10% by weight synthetic rubber (polybutadiene rubber) were poured in through a pouring pipe into the vicinity of the blade of the stirrer. The pouring velocity was about 1.0 g./min. As the toluene of the solution of the polymerized rubber poured in was stripped by forming an azeotrope with water, the ruber component was precipitated in the water as fine particles. When the steam stripping of the solvent was ended, the stirrer was stopped. The rubber particles were suspended and they floated stably on the surface of the water without adhering to each other. When stirred, these rubber particles dispersed into the water. Therefore, the aqueous slurry containing the rubber particles under the stirring could be conveyed through piping from the lower part of the stirpper to the filter by means of a pump.

EXAMPLE 2

The same stripping experiments were carried out using 0.02% Demole EP, as used in Example 1, as an anionic active agent and using the compounds listed in Table 1 as cationic active agents and by using the same apparatus as that used in Example 1. The results are shown in Table 1.

TABLE 1

| Surface active agents | | Solution of polymerized synthetic rubber | | Stripper temperature (in ° C.) | Dispersed state of the precipitated rubber |
|---|---|---|---|---|---|
| Anionic active agent | Cationic active agent | Velocity (in g./min.) | Content (in percent) | | |
| Demole EP, 0.02% | Sanisol C, 0.003% | 1.0 | 10.0 | 90–95 | Good. |
| Do | Position B, 0.003% | 1.0 | 10.0 | 90–95 | Do. |
| Do | Acetamine 86, 0.003% | 1.0 | 10.0 | 90–95 | Do. |
| Do | Diamine TDA, 0.003% | 1.0 | 10.0 | 90–95 | Do. |
| Do | Softex KZ, 0.003% | 1.0 | 10.0 | 90–95 | Do. |
| Do | Fatty acid amine hydrochloride, 0.003% | 1.0 | 10.0 | 90–95 | Do. |
| Do | Quatamine 86P, 0.003% | 1.0 | 17.0 | 90–95 | Do. |
| Do | None | 1.0 | 10.0 | 90–95 | Undispersed lumps. |
| None | Quatamine 86P, 0.003% | 1.0 | 10.0 | 90–95 | Do. |
| Do | None | 1.0 | 10.0 | 90–95 | Do. |

NOTES.—Demole EP=Polycarboxylate-type anionic surface active agent produced by Kao Soap Company, Ltd.; Sanisol= Quaternary ammonium salt-type cationic surface active agent produced by Kao Soap Co., Ltd.; Position B=Picolinium salt-type cationic surface active agent produced by Kao Soap Company, Ltd.; Acetamine 86=Higher acetamine salt-type cationic surface active agent produced by Kao Soap Company, Ltd.; Diamine TDA=Higher amine salt-type cationic surface active agent produced by Kao Soap Company, Ltd.; Softex KZ=Pyridinium salt-type cationic surface active agent produced by Kao Soap Company, Ltd.; Quatamine 86P=Quaternary ammonium salt-type cationic surface active agent produced by Kao Soap Company, Ltd.

EXAMPLE 3

Tests were made in the same manner as in Example 1, but using an amphoteric active agent instead of either of the anionic and cationic surface active agents. The pH of the aqueous solution was adjusted so that the amphoteric active agent might act either as the anionic or the cationic surface active agent. The results are listed in Table 2.

TABLE 2

| Surface active agents | | Solution of polymerized synthetic rubber | | Stripper aqueous solution | | Dispersed state of the precipitated rubber |
|---|---|---|---|---|---|---|
| Anionic active agents | Cationic active agents | Velocity (in g./min.) | Content (in percent) | pH | Temperature (in ° C.) | |
| Demole EP, 0.02% | Amphitol 24A, 0.003% | 1.0 | 10.0 | 5.5 | 90–95 | Good. |
| Do | Amphitol 60B, 0.003% | 1.0 | 10.0 | 5.5 | 90–95 | Do. |
| Do | do | 1.0 | 10.0 | 7.5 | 90–95 | Do. |
| Amphitol 24A, 0.02% | Polyvinylpyridine-type cationic polysoap, 0.003% | 1.0 | 10.0 | 11.0 | 90–95 | Substantially good. |

NOTES.—Amphitol 24A=Higher alkylalanine-type amphoteric surface active agent produced by Kao Soap Company, Ltd.; Amphitol 60B= Betaine-type amphoteric surface active agent produced by Kao Soap Company, Ltd.

EXAMPLE 1

500 cc. of an aqueous solution containing 0.02% Demole EP (trade name of a polycarboxylate-type anionic

EXAMPLE 4

0.02% of an alkali-saponified styrene-maleic anhydride copolymer was used as an anionic surface active agent together with various kinds of cationic surface active agents and the tests were made by using the same apparatus as in Example 1. The results are listed in Table 3.

TABLE 3

| Surface active agents | | Solution of polymerized synthetic rubber | | Stripper temperature (in °C.) | Dispersed state of the precipitated rubber |
|---|---|---|---|---|---|
| Anionic active agents | Cationic active agents | Velocity (in g./min.) | Content (in percent) | | |
| Styrenemaleic acid copolymer, 0.02% | Quatamine 86P, 0.003% | 1.0 | 10.0 | 90-95 | Good. |
| Do | Sanisol C., 0.003% | 1.0 | 10.0 | 90-95 | Do. |
| Do | Acetamine 86, 0.003% | 1.0 | 10.0 | 90-95 | Do. |
| Do | Position B, 0.003% | 1.0 | 10.0 | 90-95 | Do. |
| Do | None | 1.0 | 10.0 | 90-95 | Undispersed blocks. |

EXAMPLE 5

Anionic active agents and cationic active agents as listed in Table 4 were used with the same apparatus as in Example 1 and the tests were made in the same manner as described in Example 1. The results are listed in Table 4.

TABLE 4

| Surface active agents | | Dispersed state of the precipitated rubber |
|---|---|---|
| Anionic active agents | Cationic active agents | |
| 2-ethylhexylvinyl ether-maleic acid copolymer, 0.02%. | Quatamine 86P, 0.003% | Good. |
| Styrene-maleic anhydride half-amide, 0.02%. | do | Do. |
| Carboxymethyl cellulose, 0.02%. | do | Substantially good. |
| Sodium alginate, 0.02% | do | Do. |
| Sodium ligninsulfonate, 0.02%. | do | Do. |
| Formalin condensate of sodium naphthalenesulfonate, 0.02%. | do | Do. |
| Sodium polymethacrylate, 0.02%. | do | Do. |
| Lauryl sulfate, 0.003% | Polyvinyl pyridine series cationic poly-soap, 0.02%. | Do. |
| None | Quatamine 86P, 0.02% | Undispersed lumps. |

EXAMPLE 6

Experiments were carried with an n-hexane solution of 10% butyl rubber (an isoprene-isobutylene copolymer) by using the same apparatus as in Example 1. The results are shown in Table 5.

TABLE 5

| Surface active agents | | Solution of polymerized synthetic rubber | | Stripper temperature (in °C.) | Dispersed state of the precipitated rubber |
|---|---|---|---|---|---|
| Anionic active agents | Cationic active agents | Velocity (in g./min.) | Content (in percent) | | |
| Demole EP, 0.02% | Quatamine 86P, 0.003% | 1.0 | 10.0 | 85-90 | Good. |
| Styrene-maleic acid copolymer, 0.02% | do | 1.0 | 10.0 | 85-90 | Do. |
| Demole EP, 0.02% | None | 1.0 | 10.0 | 85-90 | Undispersed lumps. |

In the foregoing examples, all percentages are percentages by weight based on the weight of the polymerized rubber substance fed in.

The embodiments of the invention in which an exclusive property or privilege is claimed are defined as follows:

1. In a process for obtaining a polymer from a polymer solution which comprises feeding a solvent solution of a synthetic rubber polymer comprising a polymer or copolymer of butadiene or isoprene in an organic solvent into a body of agitated and heated water, steam stripping the solvent from the solution and recovering the polymer in the form of an aqueous slurry in which the polymer is dispersed as fine particles, the improvement which consists essentially of adding during said steam stripping both an anionic surface active agent selected from the group consisting of fatty acid salts, higher alcohol sulfates, liquid fatty oil sulfates, sulfates of aliphatic amines, sulfates of aliphatic amides, fatty alcohol phosphate esters, sulfonates of dibasic fatty acid esters, fatty acid amide sulfonates, alkylaryl sulfonates, the free acids of the above, and an anionic water-soluble macromolecular surface active agent selected from the group consisting of polymers and copolymers of acrylic acid, polymers and copolymers of methacrylic acid and their salts, partially saponified water-soluble polymers and copolymers of acrylic acid esters, partially saponified water-soluble polymers and copolymers of methacrylic esters, polymers and copolymers of unsaturated dibasic acids, their diesters and monoesters, partially saponified polymers and copolymers of acrylamide and partially saponified polymers and copolymers of acrylonitrile, formalin condensates of ligninsulfonic acid and naphthalenesulfonic acid, formalin condensates of benzene sulfonic acid and formalin condensates of creosote oil sulfonate, and polymers and copolymers of vinyl sulfonic acid, and a cationic surface active agent selected from the group consisting of aliphatic amine salts, quaternary ammonium salts, alkylpyridinium salts, polyoxyethylene alkylamine salts, imidazoline derivatives, fatty acid amine derivates (without quaternary amine), derivatives of polyamines such as diamines and triamines, and amine oxides, each of said anionic and said cationic surface active agent being used in the amount of from about 0.1 to 2.0 parts by weight per 100 parts by weight of the polymer to be recovered and a sufficient excess of one surface active agent is used to avoid precipitation of surface active agent.

2. A method according to claim 1, in which the anionic surface active agent is an anionic water-soluble macromolecular surface active agent.

3. A method according to claim 1, in which said cationic surface active agent is selected from the group consisting of polyvinyl pyridine-type poly-soaps having the structure

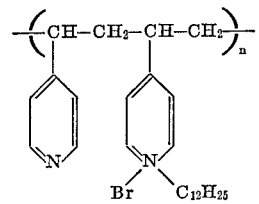

polyacrylic ester-type cationic surface active agents having the structure

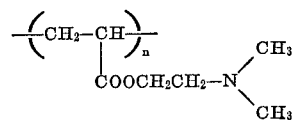

their quaternized substances, their copolymers, and polyacrylamide-type cationic surface active agents.

References Cited

UNITED STATES PATENTS

| | | | |
|---|---|---|---|
| 3,190,868 | 6/1965 | Mitacek et al. | 260—94.7 |
| 3,247,176 | 4/1966 | Veal | 260—94.7 |
| 3,258,453 | 6/1966 | Chi | 260—82.1 |
| 3,287,301 | 11/1966 | Fysh et al. | 260—23.7 |
| 3,320,220 | 5/1967 | Di Drusco | 260—80.5 |
| 3,423,388 | 1/1969 | Pampus | 260—94.7 |

FOREIGN PATENTS 899,154   3/1961   Great Britain _____ 260—94.7

JOSEPH L. SCHOFER, Primary Examiner

W. F. HAMROCK, Assistant Examiner

U.S. Cl. X.R.

260—85.1, 85.3, 96